(12) United States Patent
Zeng et al.

(10) Patent No.: US 7,313,495 B2
(45) Date of Patent: Dec. 25, 2007

(54) METHOD OF PROCESSING MARINE MAGNETIC GRADIENT DATA AND EXPLORATION METHODS USING THAT DATA

(75) Inventors: Yi Zeng, Mount Waverley (AU); Peter Mitchell Stone, Ripponlea (AU); Marion Elizabeth Rose, Glen Iris (AU)

(73) Assignee: BHP Billiton Innovation Pty Ltd., Victoria (AU)

( * ) Notice: Subject to any disclaimer, the term of this patent is extended or adjusted under 35 U.S.C. 154(b) by 0 days.

(21) Appl. No.: 10/538,709

(22) PCT Filed: Dec. 10, 2002

(86) PCT No.: PCT/AU02/01669

§ 371 (c)(1),
(2), (4) Date: May 3, 2006

(87) PCT Pub. No.: WO03/052460

PCT Pub. Date: Jun. 26, 2003

(65) Prior Publication Data

US 2006/0247857 A1    Nov. 2, 2006

(51) Int. Cl.
*G06F 19/00*    (2006.01)

(52) U.S. Cl. .............. 702/91; 702/5; 702/179; 702/180; 702/189; 702/190; 73/170.33; 367/16

(58) Field of Classification Search ........... 702/90–93, 702/53–54, 104, 116, 179–192, 2, 5, 9, 10; 324/345, 245, 244; 73/170.33; 367/16
See application file for complete search history.

(56) References Cited

U.S. PATENT DOCUMENTS

| | | | |
|---|---|---|---|
| 3,875,497 A | | 4/1975 | Madsen |
| 4,515,013 A | * | 5/1985 | Hue ................... 73/170.01 |
| 4,739,262 A | * | 4/1988 | Fleetwood ............ 324/345 |
| 4,986,121 A | * | 1/1991 | Luscombe ........... 73/170.29 |
| 5,218,300 A | | 6/1993 | Gouhier-Beraud |

\* cited by examiner

*Primary Examiner*—Jeffrey R. West
*Assistant Examiner*—Phuong Huynh
(74) *Attorney, Agent, or Firm*—Hoffmann & Baron, LLP

(57) ABSTRACT

A method of processing marine magnetic data is disclosed which comprises towing first and second magnetometers $M_1$ and $M_2$ behind a ship (10). Raw magnetic gradient data is obtained from the sensors and the trend of the gradient of the ship bias detected by the sensors determined. The method includes subtracting the trend from the raw magnetic gradient data to obtain corrected gradient data, and processing the corrected gradient data to provide a data output.

32 Claims, 6 Drawing Sheets

METHOD OF PROCESSING MARINE MAGNETIC GRADIENT DATA AND EXPLORATION METHODS USING THAT DATA

CROSS-REFERENCE TO RELATED APPLICATIONS

This application is the National Stage of International Application No. PCT/AU02/01669, filed Dec. 10, 2002, the contents of which is incorporated by reference herein.

FIELD OF THE INVENTION

This invention relates to a method of processing marine magnetic gradient data and also to exploration methods using that data.

BACKGROUND ART

Exploration of the earth to locate oil, minerals or other valuable deposits, uses seismic techniques in order to provide information about the subsurface structure of the earth so that an assessment can be made as to whether a particular deposit may or may not be present. In particular, seismic techniques provide an indication of various subsurface structures including porous sandstone or fractured carbonates which may contain oil or other valuable deposits.

Whilst this technique does provide an indication of subsurface structures, it is possible a particular structure which may appear to be of interest, in fact represents a significant hazard to drilling. For example, it is possible that subsurface volcanos exhibit very similar characteristics to anticlines which may contain oil. If a drilling operation is initiated and it is found that the anticline is in fact a volcano, then a considerable financial loss results because of the cost of establishing the drilling platform. This is particularly the case in relation to marine exploration because of the significantly higher drilling cost.

In order to provide more information concerning the nature of subsurface structures, magnetic data of the exploration area is obtained.

A magnetic gradient survey enables magnetic data relating to the survey region to be obtained and this magnetic data can be used to provide information relating to the nature of subsurface structures. If the magnetic survey is overlayed with the seismic survey, then structures which appear to be of interest from the point of view of the seismic survey, can be further considered in the light of the magnetic data so that a clearer indication can be formed as to whether the structure is a structure which may contain a deposit of interest such as an oil deposit, or whether the structure exhibits magnetic phenomena, such would be the case with a volcano. Thus, the location of drilling platforms can be decided with more precision to avoid subsurface structures which could be hazardous from the point of view of a drilling operation. However, conventional techniques for processing magnetic gradient data contain considerable distortion and anomalies due to unwanted magnetic effects including the ship bias referred to above.

The conventional method of obtaining that data in relation to onshore exploration is to tow magnetometers behind an aircraft to obtain magnetic data in relation to the survey area. In the case of marine exploration, the magnetometers are towed behind a ship.

The usefulness of marine magnetic data which is obtained in this manner has been limited by the quality of the data which is obtained. One of the major problems with marine magnetic data acquisition is interference or so-called ship bias which is created by the magnetic field induced by the ship which tows the magnetometers.

In conventional marine magnetic data acquisition, two magnetic field sensors, which are generally referred to as fish, are towed behind a ship. The magnetometers are connected to a tow line and the magnetometer which is closest to the ship is towed at a distance of some 300-600 metres behind the ship to avoid the effect of ship induced magnetic field. Furthermore, the magnetometers are separated by a distance of in excess of 100 metres. The reason for the length of the tow line and the separation of the magnetometers is to reduce ship bias and therefore provide data which is relatively free of that bias.

However, because the towing line is so long and the distance of separation so great, the degree of drift of the magnetometers in the ocean as the magnetometers are towed behind the ship is considerable. Furthermore, the processing techniques used to acquire magnetic gradient data assume that after a given time period, the trailing magnetometer will be towed to a position which coincides with a previous position of the magnetometer which is closest to the ship. This assumption is made during the processing of the magnetic data. However, because the tow line is extremely long and the distance of separation between the magnetometers is considerable, drift of the magnetometers due to sea currents and the like means it is unlikely that the trailing magnetometer will actually occupy the same position as the first magnetometer after that given time period.

Furthermore, in the acquisition of the magnetic data, the ship is required to travel along predetermined survey lines and because of the drifting of the sensors, the sensors do not actually travel along the survey line. In the southern hemisphere, if the magnetometers drift to the north of the survey line, the recorded gradient data between the two magnetometers will have larger distortion than if drifting towards the south of the survey line.

SUMMARY OF THE INVENTION

The object of the invention is to provide an improved processing method which accounts for ship-induced bias and which therefore enables the magnetometers to be towed by a tow line which is much shorter than the conventional tow line and also be located closer together to reduce the amount of drift and also increase the likelihood that the trailing magnetometer will occupy the same position which was previously occupied by the leading magnetometer after a given time period.

The invention may be said to reside in a method of processing marine magnetic data obtained by towing first and second spaced apart sensors behind a ship, the method including:

obtaining raw magnetic gradient data from the sensors;
determining the trend of the gradient of the ship bias detected by the sensors;
subtracting the trend from the raw magnetic gradient data to obtain corrected gradient data; and
processing the corrected gradient data to provide a data output.

Because the method determines the trend of the gradient of the ship bias, a more accurate estimation of the actual gradient bias introduced by the ship, having regard to any drifting of the sensors, is taken into account. By subtracting the trend of the gradient bias from the raw gradient data, the bias introduced by the ship can be removed from the data so that more accurate data is obtained. Because the present method eliminates the effect of the ship bias, the sensors can be towed much closer to the ship and at much closer separation distances, thereby reducing the amount of drift of the sensors and therefore resulting in the sensors being more likely to follow the actual survey line upon which the ship travels and also for the rear sensor to occupy the same position at a later time which was previously occupied by the front sensor. Thus, the quality of the output data is greatly improved and therefore provides data which gives a much more accurate indication of the subsurface magnetic characteristics of the survey area, which can be then used in combination with seismic data to make an assessment as to the viability of further exploration or a drilling program.

Preferably the method includes the step of determining an estimate of the gradient of the ship bias from the raw magnetic gradient data obtained by the sensors, and determining the trend of the gradient of the ship bias from that estimate of the gradient of the ship bias.

Preferably the raw magnetic gradient data is calculated as the measured magnetic signal at the leading sensor less the measured magnetic signal at the trailing sensor, divided by the distance between the sensors.

The estimate of the gradient of the ship bias may in fact simply be derived from the raw magnetic gradient data which is obtained from the sensors and which may include data relating to the gradient of the ship bias as well as data relating to other magnetic effects.

Preferably the trend of the gradient of the ship bias is determined by applying the gradient of the ship bias data to a B-Spline filter with smoothness 0.8.

Preferably the processing comprises the application of the corrected gradient data over sample intervals, integration of the corrected gradient data into total magnetic intensity data, and application of a low pass filter to the integrated total magnetic intensity data to provide the data output.

Preferably the total magnetic intensity is obtained by integrating the corrected gradient data in accordance with the following equation:

$$TMI = \sum_{i=1}^{N}[G_c \Delta x_i(t)] + M_{stat}$$

wherein $G_c$ is the corrected gradient data obtained after subtraction of the trend of the gradient of the ship bias from the raw gradient data, and $M_{stat}$ is the total magnetic intensity value at a point representing the start of the survey or at a location where a survey line and a tie line cross each other.

The values of TMI so calculated are then smoothed to remove residual noise using a low pass filter.

Preferably the gradient of the ship bias is calculated according to the following equation:

$$G_{bias} = \frac{M_f(x) - M_r(x)}{\Delta l} = \frac{[D(t_1) - D(t_2)] + [M_b(t_1) - M_b(t_2)]}{\Delta l}$$

where:

$$M_f(x) = M_e(x) + D(t_1) + M_b(t_1)$$

$$M_r(x) = M_e(x) + D(t_2) + M_b(t_2)$$

where $M_f$ is the magnetic field as measured by the front sensor and which consists of the environmental field $M_e(x)$, diurnal variation $D(t_1)$, ship bias $M_b(t_1)$ caused by ship-induced field, sensor drifting and sensor perturbation, all at time $t_1$ and along track distance x, and at some later time $t_2$, $\Delta l$ is the distance between the sensors, $D(t_2)$ is the diurnal variations sensed by the rear sensor, and $M_b(t_2)$ is the ship bias at time $t_2$ detected by the rear sensor $M_r$.

In one embodiment of the invention the first and second sensors which are towed behind the ship are included in a group of three or more towed sensors.

In this embodiment, preferably the number of sensors towed behind the ship comprises three sensors.

According to this embodiment data from any two of the sensors is used to provide the raw magnetic gradient data.

However, the embodiment may obtain raw gradient data from all three sensors and determine the trend of the gradient of the ship bias detected by all three sensors.

The invention may also be said to reside in a method of obtaining gradient data for an exploration program, the method including:

towing first and second sensors behind a ship along predetermined survey lines;

obtaining raw magnetic gradient data from the sensors;

determining the trend of the gradient of the ship bias detected by the sensors;

subtracting the trend from the raw magnetic gradient data to obtain corrected gradient data; and processing the corrected gradient data to provide a data output.

Preferably the method includes the step of determining an estimate of the gradient of the ship bias from the raw magnetic gradient data obtained by the sensors, and determining the trend of the gradient of the ship bias from that estimate of the gradient of the ship bias.

Preferably the raw magnetic gradient data is calculated as the measured magnetic signal at the leading sensor less the measured magnetic signal at the trailing sensor, divided by the distance between the sensors.

The estimate of the gradient of the ship bias may in fact simply be derived from the raw magnetic gradient data which is obtained from the sensors and which may include data relating to the gradient of the ship bias as well as data relating to other magnetic effects.

Preferably the trend of the gradient of the ship bias is determined by applying the gradient of the ship bias data to a B-Spline filter with smoothness 0.8.

Preferably the further processing comprises the application of the corrected gradient data over sample intervals, integration of the corrected gradient data into total magnetic intensity data, and application of a low passed filter to the integrated total magnetic intensity data to provide the data output.

Preferably the total magnetic intensity is obtained by integrating the corrected gradient data in accordance with the following equation:

$$TMI = \sum_{i=1}^{N}[G_c \Delta x_i(t)] + M_{stat}$$

wherein $G_c$ is the corrected gradient data obtained after subtraction of the ship bias trend from the raw gradient data, and $M_{stat}$ is the total magnetic intensity value at a point representing the start of the survey or at a location where a survey line and a tie line cross each other.

The values of TMI so calculated are then smoothed to remove residual noise using a low pass filter.

Preferably the gradient of the ship bias is calculated according to the following equation:

$$G_{bias} = \frac{M_f(x) - M_r(x)}{\Delta l} = \frac{[D(t_1) - D(t_2)] + [M_b(t_1) - M_b(t_2)]}{\Delta l}$$

where:

$$M_f(x) = M_e(x) + D(t_1) + M_b(t_1)$$

$$M_r(x) = M_e(x) + D(t_2) + M_b(t_2)$$

where $M_f$ is the magnetic field as measured by the front sensor and which consists of the environmental field $M_e(x)$, diurnal variation $D(t_1)$, ship bias $M_b(t_1)$ caused by ship-induced field, sensor drifting and sensor perturbation, all at time $t_1$ and along track distance x, and at some later time $t_2$, $\Delta l$ is the distance between the sensors, $D(t_2)$ is the diurnal variations sensed by the rear sensor, and $M_b(t_2)$ is the ship bias at time $t_2$ detected by the rear sensor $M_r$.

In one embodiment of the invention the first and second sensors which are towed behind the ship are included in a group of three or more towed sensors.

In this embodiment, preferably the number of sensors towed behind the ship comprises three sensors.

According to this embodiment data from any two of the sensors is used to provide the raw magnetic gradient data.

However, the embodiment may obtain raw gradient data from all three sensors and determine the trend of the gradient of the ship bias detected by all three sensors.

The invention may also be said to reside in a method of subsurface exploration to determine viability of drilling in a marine environment by considering magnetic data relating to the environment, and wherein the magnetic data has been obtained by:

obtaining raw magnetic gradient data from the sensors;
determining the trend of the gradient of the ship bias detected by the sensors;
subtracting the trend from the raw magnetic gradient data to obtain corrected gradient data; and
processing the corrected gradient data to provide a data output.

Preferably obtaining the magnetic data includes the step of determining the gradient of the ship bias from data obtained by the sensors, and determining the trend of the gradient of the ship bias from the gradient of the ship bias.

Preferably the raw magnetic gradient data is calculated as the measured magnetic signal at the leading sensor less the measured magnetic signal at the trailing sensor, divided by the distance between the sensors.

The estimate of the gradient of the ship bias may in fact simply be derived from the raw magnetic gradient data which is obtained from the sensors and which may include data relating to the gradient of the ship bias as well as data relating to other magnetic effects.

Preferably the trend of the gradient of the ship bias is determined by applying the gradient of the ship bias data to a B-Spline filter with smoothness 0.8.

Preferably the processing comprises the application of the corrected gradient data over sample intervals, integration of the corrected gradient data into total magnetic intensity data, and application of a low passed filter to the integrated total magnetic intensity data to provide the data output.

Preferably the total magnetic intensity is obtained by integrating the corrected gradient data in accordance with the following equation:

$$TMI = \sum_{i=1}^{N} [G_c \Delta x_i(t)] + M_{stat}$$

wherein $G_c$ is the corrected gradient data obtained after subtraction of the ship bias trend from the raw gradient data, and $M_{stat}$ is the total magnetic intensity value at a point representing the start of the survey or at a location where a survey line and a tie line cross each other.

The values of TMI so calculated are then smoothed to remove residual noise using a low pass filter.

Preferably the gradient of the ship bias is calculated according to the following equation:

$$G_{bias} = \frac{M_f(x) - M_r(x)}{\Delta l} = \frac{[D(t_1) - D(t_2)] + [M_b(t_1) - M_b(t_2)]}{\Delta l}$$

where:

$$M_f(x) = M_e(x) + D(t_1) + M_b(t_1)$$

$$M_r(x) = M_e(x) + D(t_2) + M_b(t_2)$$

where $M_f$ is the magnetic field as measured by the front sensor and which consists of the environmental field $M_e(x)$, diurnal variation $D(t_1)$, ship bias $M_b(t_1)$ caused by ship-induced field, sensor drifting and sensor perturbation, all at time $t_1$ and along track distance x, and at some later time $t_2$, $\Delta l$ is the distance between the sensors, $D(t_2)$ is the diurnal variations sensed by the rear sensor, and $M_b(t_2)$ is the ship bias at time $t_2$ detected by the rear sensor $M_r$.

In one embodiment of the invention the first and second sensors which are towed behind the ship are included in a group of three or more towed sensors.

In this embodiment, preferably the number of sensors towed behind the ship comprises three sensors.

According to this embodiment data from any two of the sensors is used to provide the raw magnetic gradient data.

However, the embodiment may obtain raw gradient data from all three sensors and determine the trend of the gradient of the ship bias detected by all three sensors.

The invention may still further be said to reside in a method of drilling for a deposit in a marine environment, including:

determining the location of drilling from data which has been obtained and which indicates the possible existence of the deposit; and
which location is also determined by magnetic data which has been obtained by towing magnetic sensors behind a ship, the magnetic data being processed by:
obtaining raw magnetic gradient data from the sensors;
determining the trend of the gradient of the ship bias detected by the sensors;
subtracting the trend from the raw magnetic gradient data to obtain corrected gradient data; and processing the corrected gradient data to provide a data output.

Preferably the method includes the step of determining an estimate of the gradient of the ship bias from the raw magnetic gradient data obtained by the sensors, and determining the trend of the gradient of the ship bias from that estimate of the gradient of the ship bias.

Preferably the raw magnetic gradient data is calculated as the measured magnetic signal at the leading sensor less the measured magnetic signal at the trailing sensor, divided by the distance between the sensors.

The estimate of the gradient of the ship bias may in fact simply be derived from the raw magnetic gradient data which is obtained from the sensors and which may include data relating to the gradient of the ship bias as well as data relating to other magnetic effects.

Preferably the trend of the gradient of the ship bias is determined by applying the gradient of the ship bias data to a B-Spline filter with smoothness 0.8.

Preferably the processing of the corrected gradient data comprises the application of the corrected gradient data over sample intervals, integration of the corrected gradient data into total magnetic intensity data, and application of a low passed filter to the integrated total magnetic intensity data to provide the data output.

Preferably the total magnetic intensity is obtained by integrating the corrected gradient data in accordance with the following equation:

$$TMI = \sum_{i=1}^{N} [G_c \Delta x_i(t)] + M_{stat}$$

wherein $G_c$ is the corrected gradient data obtained after subtraction of the ship bias trend from the raw gradient data, and $M_{stat}$ is the total magnetic intensity value at a point representing the start of the survey or at a location where a survey line and a tie line cross each other.

The values of TMI so calculated are then smoothed to remove residual noise using a low pass filter.

Preferably the gradient of the ship bias is calculated according to the following equation:

$$G_{bias} = \frac{M_f(x) - M_r(x)}{\Delta l} = \frac{[D(t_1) - D(t_2)] + [M_b(t_1) - M_b(t_2)]}{\Delta l}$$

where:

$M_f(x) = M_e(x) + D(t_1) + M_b(t_1)$ $M_r(x) = M_e(x) + D(t_2) + M_b(t_2)$ where $M_f$ is the magnetic field as measured by the front sensor and which consists of the environmental field $M_e(x)$, diurnal variation $D(t_1)$, ship bias $M_b(t_1)$ caused by ship-induced field, sensor drifting and sensor perturbation, all at time $t_1$ and along track distance x, and at some later time $t_2$, $\Delta l$ is the distance between the sensors, $D(t_2)$ is the diurnal variations sensed by the rear sensor, and $M_b(t_2)$ is the ship bias at time $t_2$ detected by the rear sensor $M_r$.

In one embodiment of the invention the first and second sensors which are towed behind the ship are included in a group of three or more towed sensors.

In this embodiment, preferably the number of sensors towed behind the ship comprises three sensors.

According to this embodiment data from any two of the sensors is used to provide the raw magnetic gradient data.

However, the embodiment may obtain raw gradient data from all three sensors and determine the trend of the gradient of the ship bias detected by all three sensors.

BRIEF DESCRIPTION OF THE DRAWINGS

A preferred embodiment of the invention will be described, by way of example, with reference to the accompanying drawings in which.

DESCRIPTION OF THE PREFERRED EMBODIMENT

Figure 1:
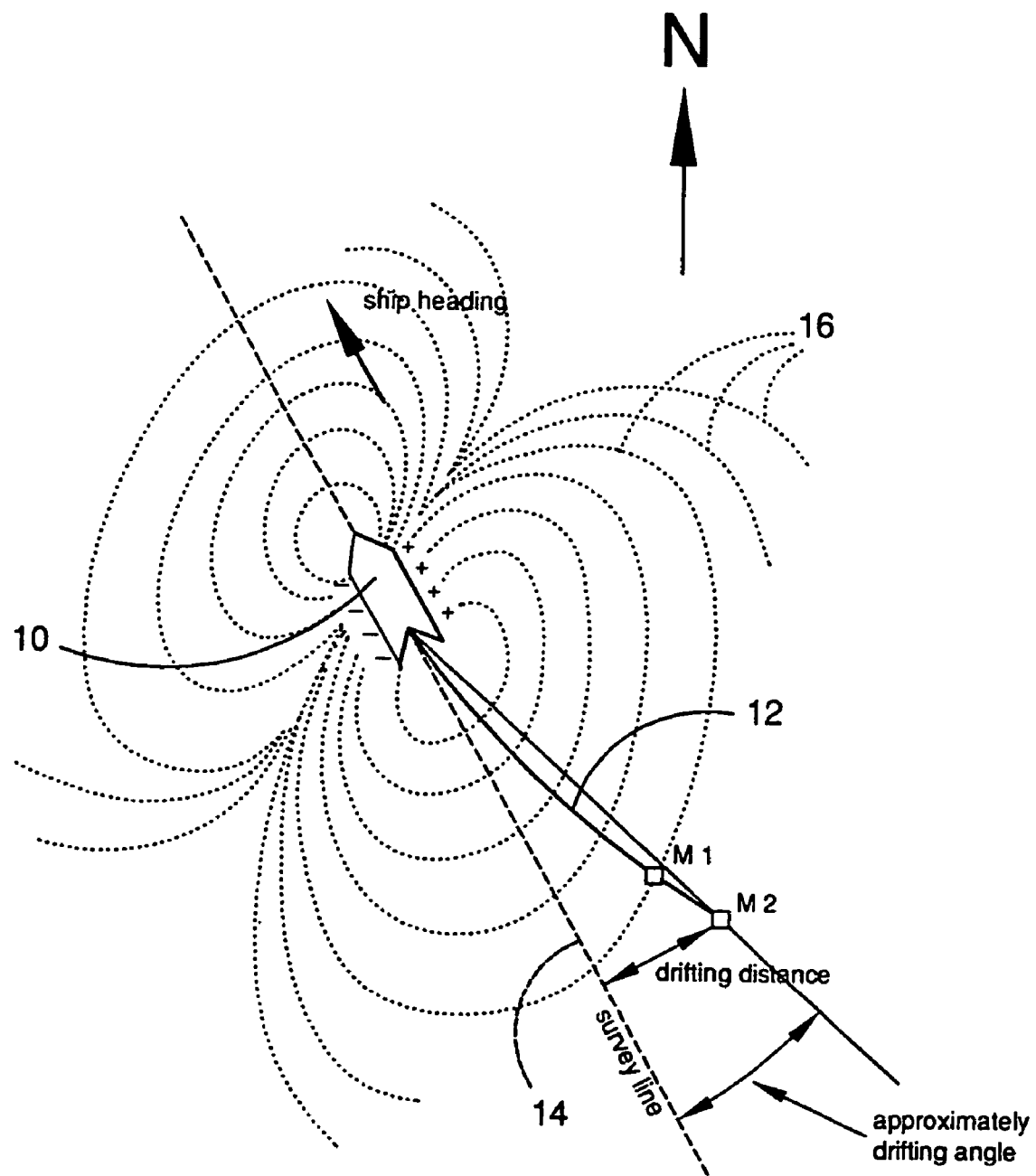
FIG. 1 is a view showing a marine magnetic data survey.

With reference to FIG. 1, a marine survey to acquire magnetic data is illustrated. A ship 10 tows first magnetometer M1 and second magnetometer M2 by a tow line 12. The ship travels along survey line 14 and the line 16, which are dotted, represent the ship-induced magnetic field.

In FIG. 1, it is assumed the ship is in the southern hemisphere and is heading north-northwest, and the sensors are drifting towards the northeast. In this case, the recorded gradient data between sensors M1 and M2 will have a larger distortion than if the sensors were drifting towards the southwest.

Ideal conditions would assume that the sensors M1 and M2 are towed directly behind the ship on the survey line and that therefore, after a given time period, the sensor M2 would occupy the same position as was previously occupied by the sensor M1. However, due to drifting of the sensors because of ocean currents and the like, this ideal situation in general cannot be achieved. Nevertheless, the processing methods used to process magnetic data do assume that the sensor M2 will occupy the same position as the sensor M1, previously occupied, but at a later time. The processing method according to the preferred embodiment enables ship bias to be accounted for much more accurately than any prior art techniques and therefore enables the sensors to be towed closer to the ship and to be separated by a smaller distance. This therefore provides much greater accuracy in the measurements because the amount of drift is not as great due to the shorter tow line and also because the separation between the sensors is smaller, the likelihood of the rear sensor occupying the same position as the front sensor at a later period in time is greatly increased.

At any time $t_1$ and along-track distance x, the front sensor measures magnetic field—$M_f$ consisting of the environment field $M_e(x)$, the diurnal variation $D(t_1)$, ship bias $M_b(t_1)$ caused by ship induced field, sensor drifting and sensor perturbation.

$$M_f(x)=M_e(x)+D(t_1)+M_b(t_1)$$

At some later time $t_2$, the rear sensor makes a measurement at the same spatial point:

$$M_r(x)=M_e(x)+D(t_2)+M_b(t_2)$$

The difference between the two measurements at the same location is:

$$M_f(x)-M_r(x)=[D(t_1)-D(t_2)]+[M_b(t_1)-M_b(t_2)]$$

Figure 2:
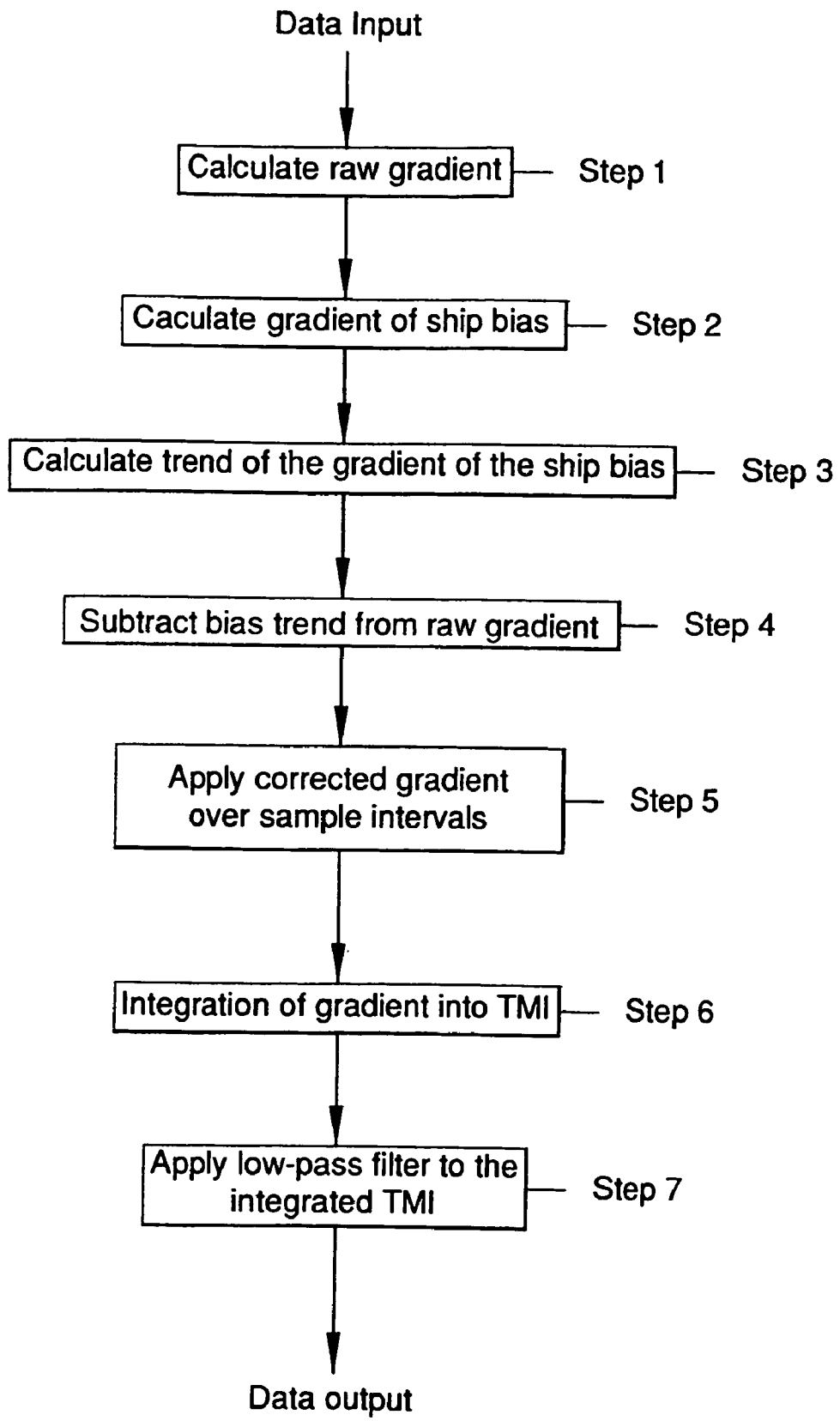
FIG. 2 is a flow chart showing the preferred method of processing the marine magnetic gradient data according to the preferred embodiment of the invention.

Ship bias gradient (Step 2, FIG. 2) can be expressed as:

$$G_{bias} = \frac{M_f(x) - M_r(x)}{\Delta l} = \frac{[D(t_1) - D(t_2)] + [M_b(t_1) - M_b(t_2)]}{\Delta l}$$

It should be mentioned that the calculated ship bias gradient is still affected by diurnal variation. In practice we notice that the sea current drifting is a kind of long wavelength variation so ship bias should be coincident with such current drifting. Step 2 in FIG. 2, which is the calculation of the gradient of the ship bias, is actually an estimate of the gradient of the ship bias which is obtained from the raw data collected by the sensors M1 and M2. The data collected by the sensors will include raw magnetic gradient data which contains many signals including environmental magnetic signals, diurnal signals and the ship bias, as well as instrument bias and drift. The trend of the gradient of the ship bias is obtained from this estimate by applying the estimate of the gradient of the ship bias to a B-Spline filter, as will be described in more detail hereinafter. Therefore the trend of the gradient of the ship bias ($G_{trend}$) (Step 3, FIG. 2) is used for the correction along a track line.

The gradient correction of the ship bias ($G_c$) can be expressed as follows:

$$G_c = G - G_{trend} \quad \text{(Step 4, FIG. 2)}$$

In this equation, G is the raw magnetic gradient data.

As said before such drifting can cause large bias effects.

Consequently, when the sensor drifting and perturbation take place simultaneously the bias zig-zag will be around its mean values. The variable mean value of the bias along a survey line is regarded as bias trend since the high frequencies of sensor perturbation only create random noise around the bias trend and after integration its effect can be eliminated from raw gradient data.

After removal of ship bias effects TMI (Total Magnetic Intensity) can be calculated (Step 6) through integration of magnetic gradient data:

$$TMI = \sum_{i=1}^{N} [Gc\Delta xi(t)] + Mstat$$

Here, $\Delta x_i(t)$ is the sampling distance along the survey line. $M_{stat}$ is the TMI value at a point of survey start or at the location where the survey line and a tie line cross each other.

Figure 2A:
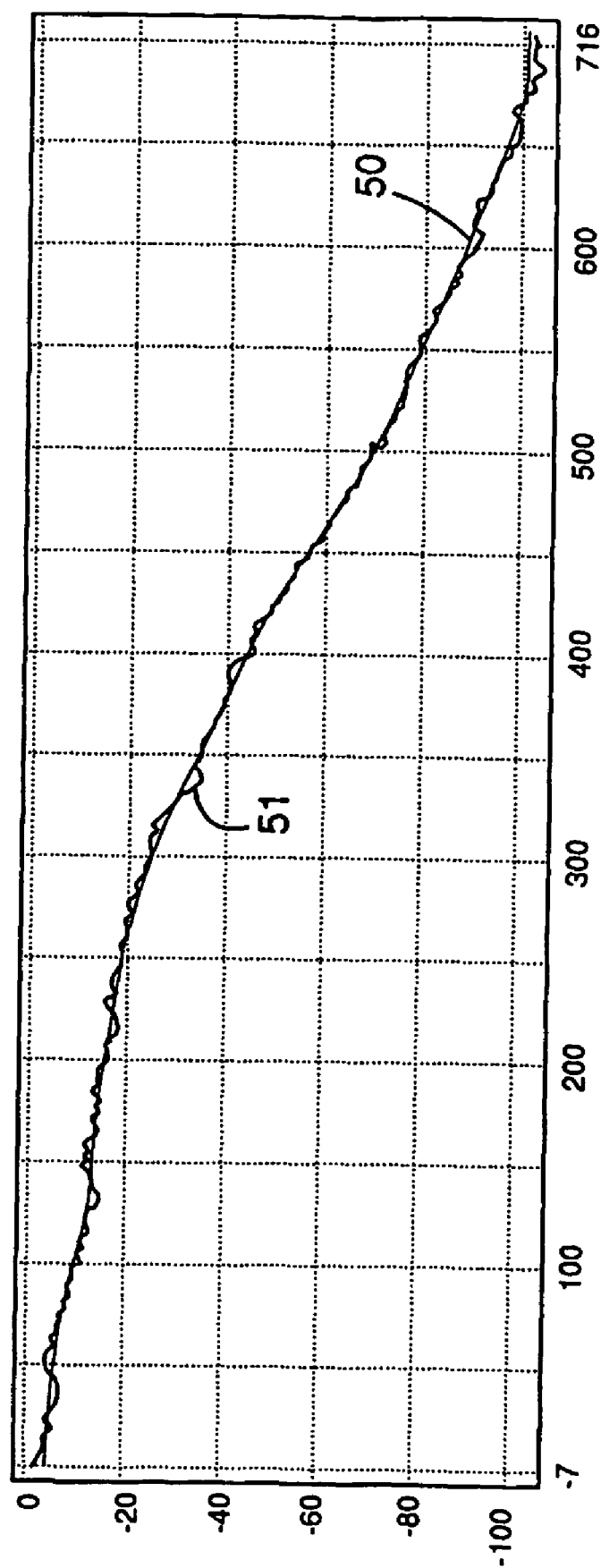
FIG. 2A is a graph showing the function of a low pass filter used in the preferred embodiment.

The TMI value calculated in Step 6 is then smoothed using a low pass filter (Step 7) to remove any features which have a greater rate of change of TMI with distance than is expected in the particular survey area. An example of the action of this filter is provided in FIG. 2A in which trace 50 is the smooth TMI curve and trace 51 is the TMI data prior to smoothing.

The data output obtained at Step 7 may include line levelling and data griding to provide a final data output.

Figure 3A:
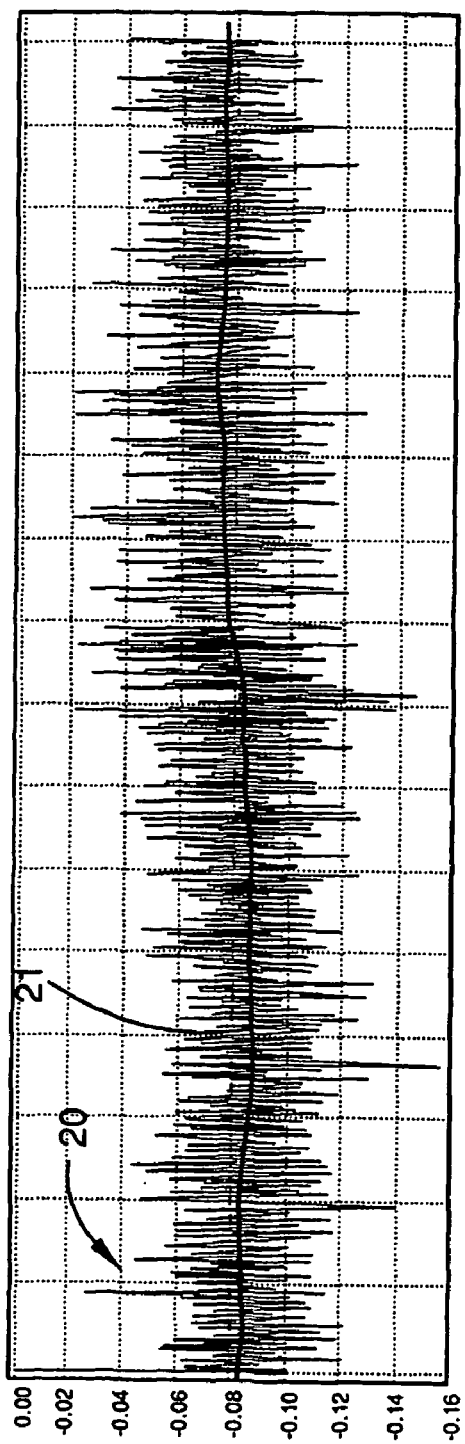
FIG. 3A and FIG. 3B are graphs showing data obtained according to the survey and as processed according to the preferred embodiment of the invention.
Figure 3B:
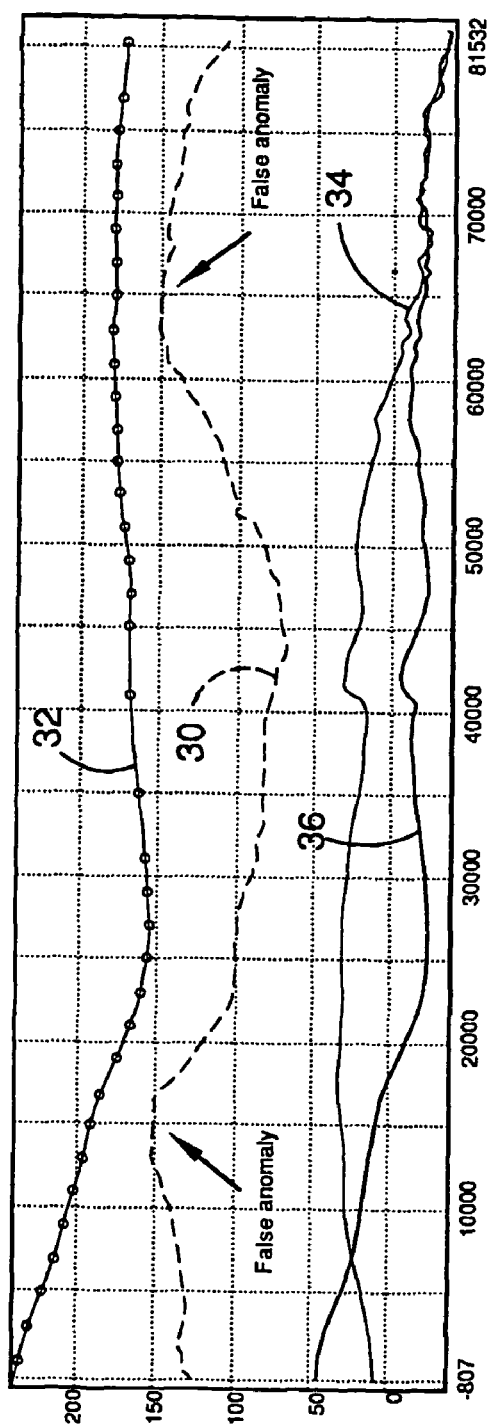

FIGS. 3A and 3B represent an actual example of the preferred embodiment of the invention which relates to raw data obtained from a known region.

In FIG. 3A, the trace 20 represents the total ship bias. The line 21 represents the bias trend and it can be seen from the left hand side of the trace 20 to the right hand side of the trace 20, the bias trend 21 changes non-uniformly about the value of −0.08 on the graph of FIG. 3A. A particular value for the bias trend can therefore be obtained for various intervals and this value can be subtracted from the raw data in order to provide the corrected data. The trend of the gradient of the ship bias is preferably determined by calculating the gradient of the bias data 20 and then applying that gradient data to a B-Spline filter with smoothness 0.8 in order to provide the representation of the ship bias 21.

In the preferred embodiment of the invention, the gradient of the bias data 20 is calculated simply by using the raw magnetic gradient data obtained from the sensors because when that data is applied to the B-Spline filter, all that remains is the gradient of the ship bias component. The ship bias 21 can then be subtracted from the calculated raw gradient.

The trend of the gradient of the ship bias is a non-linear function which is represented by the line 21 in FIG. 3A. The line is a measure of how the bias changes over time as the sensors are towed behind the ship. As is clearly seen from line 21, the trend is not constant or merely an average, but rather represents the fluctuation of the bias gradient and at some times, is above the value of 0.08 and sometimes below that value. As noted above, the trend is determined by applying the gradient of the ship bias to a B-Spline filter with smoothness 0.8. However, in other embodiments, the filter could have different smoothness depending on the region from which data is collected and the nature of the data which is collected. In general, the function of the filter is to smooth the trace 20 so that some meaningful value of the bias trend at particular time periods can be obtained. Thus, the filter is effectively determining the peaks and troughs of the trace 20 and fitting a curved line between those peaks and troughs, which gives a measure of how the gradient of the ship bias is changing with time as the sensors are towed behind the ship.

In the example of data obtained from the known region, dashed line 30 represents total magnetic intensity data which is provided according to the prior art processing technique. The line 32 represents the integrated total magnetic intensity data from the bias corrected gradient data according to the preferred embodiment of the invention. The line 34 represents the diurnal variation at a station some 500 km away from the survey area and line 36 is the observed field data including the diurnal effect.

It can be seen from the conventional processing technique, which gives line 30, false anomalies are provided which do not show up on the line 32, which is produced according to the present invention.

Figure 5:
FIG. 5 is a diagram similar to FIG. 4, but using data obtained according to the preferred embodiment of the present invention.
Figure 4:
FIG. 4 is a representation of a survey using data created according to a prior art technique.

In general, the results of the magnetic survey are produced in a colour chart. Black and white representations of a colour chart are shown as FIG. 4 in relation to conventional processing of data obtained from a known region and FIG. 5 by a processing method according to the preferred embodiment of this invention.

The characteristics of the Igneous basement of the known region are well known and it can be seen that data processed according to the present invention produces a much clearer indication of actual magnetic structures than prior art technique which include considerable interference and data which may mislead analysers into considering that magnetic structures exist which are not actually there, or that magnetic structures do not exist when a magnetic structure actually is present.

Thus, the preferred embodiment of the present invention provides data which more accurately reflects the likelihood of magnetic structures which can then be used as a basis for determining the viability of a drilling operation in an exploration or recovery program.

Figure 6:
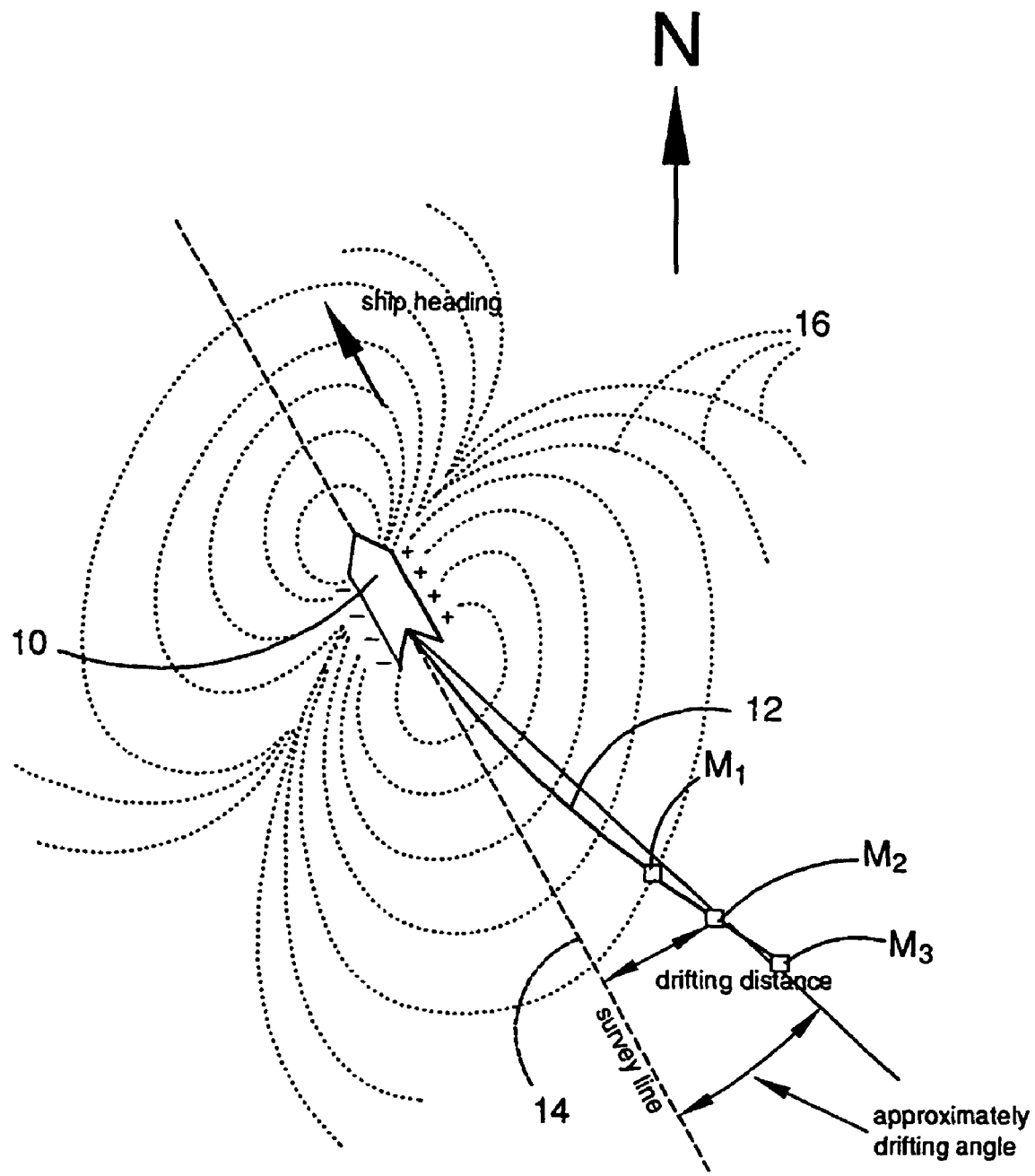
FIG. 6 is a view of a further embodiment of the invention.

FIG. 6 shows a second embodiment of the invention in which like reference numerals indicate like components to those described with reference to FIG. 1. In this embodiment, three magnetometers $M_1$, $M_2$ and $M_3$ are towed by the ship 10 on tow line 12. This embodiment therefore builds some redundancy into the system in that, should one of the sensors fails, two sensors are still available in order to provide the required gradient data, and therefore there is considerably less likelihood that a survey will be wasted should a ship complete the survey only to find that one of the magnetometers has not operated properly. In this embodiment, preferably the distance between the magnetometers $M_1$ and $M_2$, and the distance between the magnetometers $M_2$ and $M_3$ is about 15 metres. The towing distance between the ship 10 and the first magnetometer $M_1$ is preferably about 150 metres or less.

This embodiment provides the further advantage that any group of two sensors can be used to provide the gradient data, and therefore the gradient data could be provided by the magnetometers $M_1$ and $M_2$, the magnetometers $M_2$ and $M_3$, or the magnetometers $M_1$ and $M_3$. This embodiment provides the further advantage that all three magnetometers could be used to provide the data to enable the calculation of the raw gradient and the gradient of the ship bias. The use of three magnetometers may improve accuracy because of the increased amount of data which is collected.

Obviously, more than three magnetometers could be used if desired, thereby increasing the amount of data collected and reducing the likelihood that a survey will be wasted because at least two of the magnetometers are not operated properly.

Since modifications within the spirit and scope of the invention may readily be effected by persons skilled within the art, it is to be understood that this invention is not limited to the particular embodiment described by way of example hereinabove.

The invention claimed is:

1. A method of determining the subsurface structure of a survey area by processing marine magnetic data obtained by towing first and second spaced apart sensors behind a ship, the method including:
   obtaining raw magnetic gradient data from the sensors;
   determining an estimate of the gradient of the ship bias from the raw magnetic gradient data obtained by the sensors;
   determining the trend of the gradient of the ship bias from that estimate of the gradient of the ship bias;
   subtracting the trend from the raw magnetic gradient data to obtain corrected gradient data;
   processing the corrected gradient data to provide a data output; and
   processing the data output to determine the subsurface structure of the survey area.

2. The method of claim 1 wherein the raw magnetic gradient data is calculated as the measured magnetic signal at the first sensor of the spaced apart sensor less the measured magnetic signal at the second sensor of the spaced apart sensor, divided by the distance between the sensors.

3. The method of claim 1 wherein the trend of the gradient of the ship bias is determined by applying the gradient of the ship bias data to a B-Spline filter with smoothness 0.8.

4. The method of claim 1 wherein the processing comprises the application of the corrected gradient data over sample intervals, integration of the corrected gradient data into total magnetic intensity data, and application of a low pass filter to the integrated total magnetic intensity data to provide the data output.

5. The method of claim 4 wherein the total magnetic intensity is obtained by integrating the corrected gradient data in accordance with the following equation:

$$TMI = \sum_{i=1}^{N} [G_c \Delta x_i(t)] + M_{stat}$$

wherein $G_c$ is the corrected gradient data obtained after subtraction of the trend of the gradient of the ship bias from the raw gradient data, and $M_{stat}$ is the total magnetic intensity value at a point representing the start of the survey or at a location where a survey line and a tie line cross each other.

6. The method of claim 1 wherein the gradient of the ship bias is calculated according to the following equation:

$$G_{bias} = \frac{M_f(x) - M_r(x)}{\Delta l} = \frac{[D(t_1) - D(t_2)] + [M_b(t_1) - M_b(t_2)]}{\Delta l}$$

where:

$$M_f(x) = M_e(x) + D(t_1) + M_b(t_1)$$

$$M_r(x) = M_e(x) + D(t_2) + M_b(t_2)$$

where $M_f$ is the magnetic field as measured by the first sensor and which consists of the environmental field $M_e(x)$, diurnal variation $D(t_1)$, ship bias $M_b(t_1)$ caused by ship-induced field, sensor drifting and sensor perturbation, all at time $t_1$ and along track distance x, and at some later time $t_2$, $\Delta l$ is the distance between the sensors, $D(t_2)$ is the diurnal variations sensed by the second sensor, and $M_{second}(t_2)$ is the ship bias at time $t_2$ detected by the rear sensor $M_r$.

7. The method of claim 1 wherein the first and second sensors which are towed behind the ship are included in a group of three or more towed sensors.

8. The method of claim 7 wherein the number of sensors towed behind the ship comprises three sensors.

9. A method of determining the subsurface structure of a survey area by obtaining gradient data for an exploration program, the method including:
   towing first and second sensors behind a ship along predetermined survey lines;
   obtaining raw magnetic gradient data from the sensors;
   determining an estimate of the gradient of the ship bias from the raw magnetic gradient data obtained by the sensors;
   determining the trend of the gradient of the ship bias from that estimate of the gradient of the ship bias;

subtracting the trend from the raw magnetic gradient data to obtain corrected gradient data;

processing the corrected gradient data to provide a data output; and processing the data output to determine the subsurface structure of the survey area.

10. The method of claim 9 wherein the raw magnetic gradient data is calculated as the measured magnetic signal at the first sensor of the sensors less the measured magnetic signal at the second sensor of the sensors, divided by the distance between the sensors.

11. The method of claim 9 wherein the trend of the gradient of the ship bias is determined by applying the gradient of the ship bias data to a B-Spline filter with smoothness 0.8.

12. The method of claim 9 wherein the further processing comprises the application of the corrected gradient data over sample intervals, integration of the corrected gradient data into total magnetic intensity data, and application of a low passed filter to the integrated total magnetic intensity data to provide the data output.

13. The method of claim 12 wherein the total magnetic intensity is obtained by integrating the corrected gradient data in accordance with the following equation:

$$TMI = \sum_{i=1}^{N} [G_c \Delta x_i(t)] + M_{stat}$$

wherein $G_c$ is the corrected gradient data obtained after subtraction of the ship bias trend from the raw gradient data, and $M_{stat}$ is the total magnetic intensity value at a point representing the start of the survey or at a location where a survey line and a tie line cross each other.

14. The method of claim 9 wherein the gradient of the ship bias is calculated according to the following equation:

$$G_{bias} = \frac{M_f(x) - M_r(x)}{\Delta l} = \frac{[D(t_1) - D(t_2)] + [M_b(t_1) - M_b(t_2)]}{\Delta l}$$

where:

$$M_f(x) = M_e(x) + D(t_1) + M_b(t_1)$$

$$M_r(x) = M_e(x) + D(t_2) + M_b(t_2)$$

where $M_f$ is the magnetic field as measured by the first sensor and which consists of the environmental field $M_e(x)$, diurnal variation $D(t_1)$, ship bias $M_b(t_1)$ caused by ship-induced field, sensor drifting and sensor perturbation, all at time $t_1$ and along track distance x, and at some later time $t_2$, $\Delta l$ is the distance between the sensors, $D(t_2)$ is the diurnal variations sensed by the second sensor, and $M_{second}(t_2)$ is the ship bias at time $t_2$ detected by the rear sensor $M_r$.

15. The method of claim 9 wherein the first and second sensors which are towed behind the ship are included in a group of three or more towed sensors.

16. The method of claim 15 wherein the number of sensors towed behind the ship comprises three sensors.

17. A method of subsurface exploration to determine viability of drilling by determining a subsurface structure of a survey region in a marine environment by considering magnetic data relating to the environment, and wherein the magnetic data has been obtained by:

obtaining raw magnetic gradient data from a plurality of sensors;

determining the gradient of the ship bias from data obtained by the sensors;

determining the trend of the gradient of the ship bias from the gradient of the ship bias;

subtracting the trend from the raw magnetic gradient data to obtain corrected gradient data; and processing the corrected gradient data to provide a data output; and processing the data output to determine the subsurface structure of the survey region.

18. The method of claim 17 wherein the raw magnetic gradient data is calculated as the measured magnetic signal at a leading sensor of the plurality of sensors less the measured magnetic signal at a trailing sensor of the plurality of sensors, divided by the distance between the sensors.

19. The method of claim 17 wherein the trend of the gradient of the ship bias is determined by applying the gradient of the ship bias data to a B-Spline filter with smoothness 0.8.

20. The method of claim 17 wherein the processing comprises the application of the corrected gradient data over sample intervals, integration of the corrected gradient data into total magnetic intensity data, and application of a low passed filter to the integrated total magnetic intensity data to provide the data output.

21. The method of claim 20 wherein the total magnetic intensity is obtained by integrating the corrected gradient data in accordance with the following equation:

$$TMI = \sum_{i=1}^{N} [G_c \Delta x_i(t)] + M_{stat}$$

wherein $G_c$ is the corrected gradient data obtained after subtraction of the ship bias trend from the raw gradient data, and $M_{stat}$ is the total magnetic intensity value at a point representing the start of the survey or at a location where a survey line and a tie line cross each other.

22. The method of claim 17 wherein the gradient of the ship bias is calculated according to the following equation:

$$G_{bias} = \frac{M_f(x) - M_r(x)}{\Delta l} = \frac{[D(t_1) - D(t_2)] + [M_b(t_1) - M_b(t_2)]}{\Delta l}$$

where:

$$M_f(x) = M_e(x) + D(t_1) + M_b(t_1)$$

$$M_r(x) = M_e(x) + D(t_2) + M_b(t_2)$$

where $M_f$ is the magnetic field as measured by the first sensor and which consists of the environmental field Me(x), diurnal variation $D(t_1)$, ship bias $M_b(t_1)$ caused by ship-induced field, sensor drifting and sensor perturbation, all at time $t_1$ and along track distance x, and at some later time $t_2$, $\Delta l$ is the distance between the sensors, $D(t_2)$ is the diurnal variations sensed by the second sensor, and $M_{second}(t_2)$ is the ship bias at time $t_2$ detected by the rear sensor $M_r$.

23. The method of claim 17 wherein the number of sensors towed behind the ship comprises three sensors.

24. A method of drilling for a deposit in a marine environment, including:
   determining the location of drilling from data which has been obtained and which indicates the possible existence of the deposit; and
   which location is also determined by magnetic data which has been obtained by towing a first and a second spaced apart magnetic sensors behind a ship, the magnetic data being processed by:
   obtaining raw magnetic gradient data from the sensors;
   determining an estimate of the gradient of the ship bias from the raw magnetic gradient data obtained by the sensors;
   determining the trend of the gradient of the ship bias from that estimate of the gradient of the ship bias;
   subtracting the trend from the raw magnetic gradient data to obtain corrected gradient data; and
   processing the corrected gradient data to provide a data output.

25. The method of claim 24 wherein the raw magnetic gradient data is calculated as the measured magnetic signal at the first sensor of the magnetic sensors less the measured magnetic signal at the second sensor of the magnetic sensors, divided by the distance between the sensors.

26. The method of claim 24 wherein the trend of the gradient of the ship bias is determined by applying the gradient of the ship bias data to a B-Spline filter with smoothness 0.8.

27. The method of claim 24 wherein the processing of the corrected gradient data comprises the application of the corrected gradient data over sample intervals, integration of the corrected gradient data into total magnetic intensity data, and application of a low passed filter to the integrated total magnetic intensity data to provide the data output.

28. The method of claim 27 wherein the total magnetic intensity is obtained by integrating the corrected gradient data in accordance with the following equation:

$$TMI = \sum_{i=1}^{N} [G_c \Delta x_i(t)] + M_{stat}$$

wherein $G_c$ is the corrected gradient data obtained after subtraction of the ship bias trend from the raw gradient data, and $M_{stat}$ is the total magnetic intensity value at a point representing the start of the survey or at a location where a survey line and a tie line cross each other.

29. The method of claim 24 wherein the gradient of the ship bias is calculated according to the following equation:

$$G_{bias} = \frac{M_f(x) - M_r(x)}{\Delta l} = \frac{[D(t_1) - D(t_2)] + [M_b(t_1) - M_b(t_2)]}{\Delta l}$$

where:

$$M_f(x) = M_e(x) + D(t_1) + M_b(t_1)$$

$$M_r(x) = M_e(x) + D(t_2) + M_b(t_2)$$

where Mf is the magnetic field as measured by the front sensor and which consists of the environmental field $M_e(x)$, diurnal variation $D(t_1)$, ship bias $M_b(t_1)$ caused by ship-induced field, sensor drifting and sensor perturbation, all at time $t_1$ and along track distance x, and at some later time $t_2$, $\Delta 1$ is the distance between the sensors, $D(t_2)$ is the diurnal variations sensed by the rear sensor, and
$M_b(t_2)$ is the ship bias at time $t_2$ detected by the rear sensor $M_r$.

30. The method of claim 24 wherein the first and second sensors which are towed behind the ship are included in a group of three or more towed sensors.

31. The method of claim 30 wherein the number of sensors towed behind the ship comprises three sensors.

32. The method of claim 31 wherein data from any two of the sensors is used to provide the raw magnetic gradient data.

* * * * *